(12) United States Patent
Grave et al.

(10) Patent No.: US 10,917,133 B2
(45) Date of Patent: Feb. 9, 2021

(54) DEVICE AND METHOD FOR REDUCING THE SELF INTERFERENCE SIGNAL IN A FULL-DUPLEX COMMUNICATION SYSTEM

(71) Applicant: COMMISSARIAT A L'ENERGIE ATOMIQUE ET AUX ENERGIES ALTERNATIVES, Paris (FR)

(72) Inventors: Baptiste Grave, Lyons (FR); Alexandre Giry, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/130,865

(22) Filed: Sep. 13, 2018

(65) Prior Publication Data

US 2019/0097674 A1   Mar. 28, 2019

(30) Foreign Application Priority Data

Sep. 27, 2017  (FR) ..................... 17 58937

(51) Int. Cl.
*H04W 72/04*   (2009.01)
*H04B 1/525*   (2015.01)
(Continued)

(52) U.S. Cl.
CPC .......... *H04B 1/525* (2013.01); *H04B 1/0475* (2013.01); *H04B 1/10* (2013.01); *H04B 1/123* (2013.01);
(Continued)

(58) Field of Classification Search
CPC .......... H04B 1/525; H04B 1/123; H04B 1/10; H04B 1/126; H04B 1/56; H04B 1/0475;
(Continued)

(56) References Cited

U.S. PATENT DOCUMENTS 9,887,728 B2*  2/2018  Jain ........................ H04B 1/525
2013/0301487 A1* 11/2013 Khandani ............. H04W 16/14
370/278
(Continued)

FOREIGN PATENT DOCUMENTS

EP         3048739 A1 *  7/2016  ............. H04B 1/123
EP       3 151 495 A1     4/2017
IN    6593CHE2014 A  *  7/2016

OTHER PUBLICATIONS

Bharadia, et al., "Full duplex radios", SIGCOMM '13 Proceedings of the ACM SIGCOMM 2013 conference on SIGCOMM, Aug. 12-16, 2013.
(Continued)

*Primary Examiner* — Hassan Kizou
*Assistant Examiner* — Mahbubul Bar Chowdhury
(74) *Attorney, Agent, or Firm* — BakerHostetler

(57) ABSTRACT

A device for reducing a self-interference contribution in a full-duplex wireless communication system configured to transmit a transmission signal and modulated by a baseband signal, and configured to receive a reception signal containing a self-interference contribution corresponding to the transmission signal, the reduction device comprising a first reduction module, configured to take a replica of the transmission signal, and configured to generate a first reduction signal, the device further comprising: a second reduction module, arranged so as to be able to take a replica of the baseband signal, and capable of generating a second reduction signal that is a function of the temporal derivative of the baseband signal, a subtractor, linked to the first reduction module and to the second reduction module, and configured to subtract from the reception signal the first reduction signal and the second reduction signal.

7 Claims, 5 Drawing Sheets

(51) Int. Cl.
*H04B 1/56* (2006.01)
*H04B 1/04* (2006.01)
*H04B 15/00* (2006.01)
*H04B 1/12* (2006.01)
*H04B 15/04* (2006.01)
*H04B 3/23* (2006.01)
*H04B 1/10* (2006.01)
*H04L 5/14* (2006.01)

(52) U.S. Cl.
CPC ............... *H04B 1/126* (2013.01); *H04B 1/56* (2013.01); *H04B 3/23* (2013.01); *H04B 3/232* (2013.01); *H04B 15/00* (2013.01); *H04B 15/04* (2013.01); *H04L 5/1461* (2013.01)

(58) Field of Classification Search
CPC .......... H04B 3/232; H04B 3/23; H04B 15/04; H04B 15/00; H04L 5/1461
See application file for complete search history.

(56) References Cited

U.S. PATENT DOCUMENTS

| | | |
|---|---|---|
| 2013/0301488 A1 | 11/2013 | Hong et al. |
| 2014/0348018 A1* | 11/2014 | Bharadia ............... H04L 5/1461 370/252 |
| 2015/0318976 A1 | 11/2015 | Eltawil et al. |
| 2016/0226535 A1* | 8/2016 | Choi ...................... H04B 1/525 |
| 2016/0226653 A1* | 8/2016 | Bharadia ................ H04B 1/525 |
| 2016/0295596 A1* | 10/2016 | Masmoudi ............... H04B 1/40 |
| 2016/0373234 A1* | 12/2016 | Ju ............................ H04B 7/10 |
| 2017/0054472 A1* | 2/2017 | Zhang .................... H04B 3/238 |
| 2018/0131502 A1* | 5/2018 | Askar .................. H04B 1/1027 |

OTHER PUBLICATIONS

Zhang, et al., "A 1.7-to-2.2GHz full-duplex transceiver system with >50dB self-interference cancellation over 42MHz bandwidth", 2017 IEEE International Solid-State Circuits Conference (ISSCC), 2017.

\* cited by examiner

DEVICE AND METHOD FOR REDUCING THE SELF INTERFERENCE SIGNAL IN A FULL-DUPLEX COMMUNICATION SYSTEM

CROSS-REFERENCE TO RELATED APPLICATIONS

This application claims priority to foreign French patent application No. FR 1758937, filed on Sep. 27, 2017, the disclosure of which is incorporated by reference in its entirety.

FIELD OF THE INVENTION

The invention relates to a device and to a method for reducing the self-interference signal that is present in a reception signal of a full-duplex communication system.

BACKGROUND

Communication networks these days have to provide an increasingly higher bit rate, with an increasingly congested frequency spectrum. The conventional telecommunication methods rely on a so-called half-duplex technology, in which the transmitter and the receiver communicate alternately (Time Division Duplexing) or on different frequency bands (Frequency Division Duplexing).

The so-called in band full-duplex (IBFD) technology relies on the principle of transmission and reception at the same time and on the same frequency band, which theoretically makes it possible to reduce the spectral occupancy of the communication signal by a factor of two.

However, the main issue of the "In Band Full-duplex" technology lies in the reduction of the self-interference signal ("Self-interference cancellation") which results from the interference between the transmission channel and the reception channel. The environment can also have an influence on the number and the power of the interferences, for example in the case of reflection of the transmission signal on a wall. In the context of WiFi communication, the signals being transmitted with an average power of 20 dBm (100 mW) and the reception threshold being approximately −90 dBm (1 pW), the self-interference ought to be reduced by 110 dBm.

In a system with two antennas, one operating in transmission while the other operates simultaneously in reception, the natural insulation between the two antennas can be of the order of 30 dB which is insufficient. FIG. 1A schematically illustrates a full-duplex system with a single antenna, comprising one antenna ANT for transmitting and receiving signals, a circulator CIRC configured to insulate the transmission channel from the reception channel, a power amplifier PA configured to amplify the transmission signals, and a low noise amplifier LNA configured to amplify the very low reception signals from the antenna ANT. In this configuration, the insulation between the input and output channels can be of the order of 20 dB, which is also insufficient. The circulator CIRC in fact allows a "leakage" signal to pass (FIGS. 1A and 1B, PATH1), which corresponds to a first contribution of a self-interference signal to be reduced. Other contributions have to be able to be reduced, such as, for example, the transmission signal reflected by the antenna towards the reception channel, because of a poor matching of the antenna (FIGS. 1A and 1B, PATH2).

Hereinafter in the description, "antenna interface" will be the term used to denote the assembly comprising at least one antenna and, possibly, at least one interface block, which can be, for example, but in a nonlimiting manner, an insulator or a circulator.

To cancel these self-interference contributions, it is well known practice (FIG. 2A) to use a signal reduction module $B_{CC}$ capable of taking a replica of the transmission signal $TX_{OUT}$ and of applying a delay (corresponding in particular to the passage of the transmission signal through the antenna interface INT) and an attenuation to it. This corrected signal $SIG_{CC}$ is called "first reduction signal". The difference signal RES between, on the one hand, the signal received by the antenna interface $RX_{IN}$ and, on the other hand, the first reduction signal $SIG_{CC}$, then makes it possible to process, on the reception channel, only the received signal having a sufficiently reduced self-interference contribution. In practice, the phase and the amplitude of the first reduction signal are determined by the signal reduction module to generate a destructive interference with the signal received by the antenna interface INT (identical amplitude of the two signals in phase opposition), and thus cancel the self-interference contribution in the signal received by the antenna interface.

FIG. 2B illustrates a result of simulation of the system illustrated by FIG. 2A, using a single-carrier modulation signal QPSK, with a throughput of 20 MSps, and the corresponding signals I and Q. The case is assumed in which the envelope of the transmission signal is almost constant (for example between 0.15 µs and 0.20 µs in FIG. 2B). The first reduction module $B_{CC}$ takes, at an instant t, a replica of the transmission signal $TX_{OUT}$, and aligns the phase of the replica of the transmission signal $TX_{OUT}$ on the signal received by the antenna interface $RX_{IN}$ at an instant t+δt, as a function of the complex gain parameters defined during a calibration step. Even if the signal received by the antenna interface $RX_{IN}$ is received with a delay Δt very much greater than δt, the envelope of the transmission signal $TX_{OUT}$ does not change between t and Δt, so the difference signal RES is really nil, and the self-interference contribution is really erased.

Now take the case of a variation of the envelope of the transmission signal (for example between 0.05 µs and 0.15 µs in FIG. 2B). The first reduction module $B_{CC}$ takes, at an instant t, a replica of the transmission signal $TX_{OUT}$, and aligns, with a phase-shift of 180°, the phase of the replica of the transmission signal $TX_{OUT}$ on the signal received by the antenna interface $RX_{IN}$ at an instant t+δt, as a function of the complex gain parameters defined during a calibration step. Given that the envelope of the transmission signal $TX_{OUT}$ changes between t and Δt, the difference signal RES is non-nil and the self-interference contribution is not erased.

By using different delay lines instead of phase-shifters, it would be possible to suitably erase the different self-interference contributions. Thus, there are known from the prior art the document US 2013/0301488 and the article "Full-duplex Radios" (Bharadia, McMilin; and Katti, conference ACM SIGCOMM'13, Hong-Kong, August 2013, also available from the link http://www.stanford.edu?skatti/pubs sigcomm13-fullduplex.pdf), which describe a device for reducing the self-interference signal present in a reception signal of a full-duplex system transmitting a transmission signal. The device comprises a means for generating a difference signal between, on the one hand, the reception signal and, on the other hand, a first reduction signal generated by a first signal reduction module capable of applying variable delays and variable attenuations to the transmission signal. This device thus makes it possible to apply different delays with attenuators specific to each delay line, which prevent the appearance of residues in the case of variation of the amplitude of the envelope. However, this solution is unsatisfactory, because the different delay lines used to apply the variable delays occupy a significant silicon surface area, which is inconsistent with the development of communication objects of small size and at low cost, such as mobile terminals.

Also known from the prior art is the document "A 1.7-to-2.2 GHz Full-Duplex Transceiver System with >50 dB Self-Interference Cancellation over 42 MHz Bandwidth" (Zhang et al., ISSC 2017), which describes a device for reducing the self-interference signal present in a reception signal of a full-duplex system. This document proposes using a first module for reducing the radio signal received ("Wideband Cancellation SIC1"), operating on the transmission carrier $LO_2$, and a second module for reducing the signal, this time baseband, of the residue deriving from the first module ("Wideband Cancellation SIC2"), and operating on the reception carrier $LO_1$. Nor is this solution satisfactory, because it uses a clock synchronization between the transmission and reception carriers, even though the full-duplex does not require clock synchronization between transmission and reception.

SUMMARY OF THE INVENTION

The invention therefore aims to eliminate the residual self-interference contributions in a full-duplex reception signal, notably in case of variation of the envelope signal for single-carrier signals (for example in QPSK modulation) or multiple-carrier signals (for example in OFDM modulation), with a device having a minimal footprint, and not requiring clock synchronization between transmission and reception.

One object of the invention that makes it possible to achieve this aim is therefore a device for reducing at least one self-interference contribution in a full-duplex wireless communication system configured to transmit a transmission signal with a transmission carrier and modulated by a baseband signal, and configured to receive a reception signal containing at least one self-interference contribution corresponding to the transmission signal, said reduction device comprising at least one first reduction module, configured to take a replica of the transmission signal, and configured to generate a first reduction signal, the device further comprising:

a second reduction module, arranged so as to be able to take a replica of the baseband signal, and capable of generating a second reduction signal that is a function of the temporal derivative of the baseband signal,
 a subtractor, linked to the first reduction module and to the second reduction module, and configured to subtract from the reception signal the first reduction signal and the second reduction signal.

Advantageously, the device is configured to supply the second reduction module with a temporal derivative of the replica of the baseband signal mixed with the transmission carrier.

Advantageously, the device is configured to apply a digital delay to the replica of the baseband signal before said replica is supplied to the second reduction module.

Advantageously, the first reduction module is configured to apply a first complex gain to a replica of the transmission signal in order to supply the first reduction signal, the first complex gain being determined so as to generate a destructive interference between the self-interference contribution included in the reception signal and the first reduction signal.

Advantageously, the second reduction module is configured to apply a second complex gain to the temporal derivative of the replica of the baseband signal mixed with the transmission carrier, the second complex gain being determined so as to generate a destructive interference between, on the one hand, a residue of the destructive interference between the self-interference contribution included in the reception signal and the first reduction signal, and, on the other hand, the second reduction signal.

Another subject of the invention is a communication device, comprising a plurality of communication nodes, at least one of the communication nodes being equipped with an abovementioned device for reducing at least one self-interference contribution, and a device for reducing interferences generated by the other communication nodes.

Another subject of the invention is a method for reducing at least one self-interference contribution in a full-duplex wireless communication system, configured to transmit a transmission signal with a transmission carrier and modulated by a baseband signal, and configured to receive a reception signal containing at least one self-interference contribution corresponding to the transmission signal, said reduction method comprising at least one first reduction step, in which a first reduction module takes a replica of the transmission signal and generates a first reduction signal, the method further comprising at least the following steps:

a second reduction step, in which a second reduction module generates a second reduction signal that is a function of the temporal derivative of the replica of the baseband signal,
 a subtraction step in which the first reduction signal and the second reduction signal are subtracted from the reception signal.

Advantageously, a temporal derivative of said replica of the baseband signal mixed with the transmission carrier is supplied to the second reduction module.

Advantageously, a digital delay is applied to said replica of the baseband signal before said replica is supplied to the second reduction module.

Advantageously, the first reduction module applies a first complex gain to a replica of the transmission signal in order to supply the first reduction signal, the first complex gain being determined so as to generate a destructive interference between the self-interference contribution included in the reception signal and the first reduction signal.

Advantageously, the second reduction module applies a second complex gain to the temporal derivative of the replica of the baseband signal mixed with the transmission carrier, the second complex gain being determined so as to generate a destructive interference between, on the one hand, a residue of the destructive interference between the at least one self-interference contribution included in the reception signal and the first reduction signal, and, on the other hand, the second reduction signal.

Advantageously, the method further comprises a calibration step, said calibration step comprising the following substeps:

a first substep of determination of the first complex gain of the first reduction module, which minimizes the difference between the self-interference contribution included in the reception signal and corresponding to the transmission signal, and the first reduction signal, called residue signal; then a second substep of determination of the second complex gain of the second reduction module which minimizes the difference between the residue signal and the second reduction signal.

Advantageously, the method further comprises a substep of determination of the digital delay minimizing the difference between the residue signal and the second reduction signal.

According to a variant, said substep of determination of the second complex gain further comprises the determination of the digital delay minimizing the difference between the residue signal and the second reduction signal.

Advantageously, said calibration step is performed periodically or in case of a change of the environment of the full-duplex wireless communication system.

BRIEF DESCRIPTION OF THE DRAWINGS

Other features, details and advantages of the invention will emerge on reading the description given with reference to the attached drawings given by way of example and which represent, respectively.

DETAILED DESCRIPTION

Figure 2A:
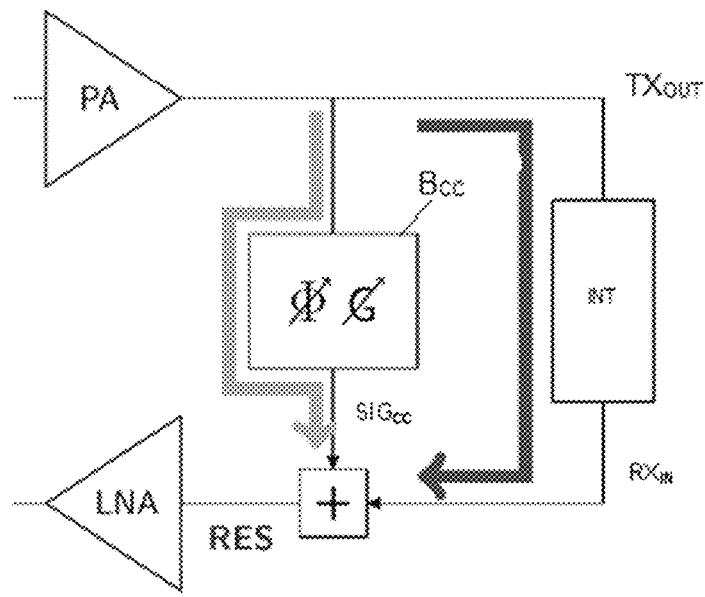
FIG. 2A: a diagram of the prior art of self-interference reduction (already described)
Figure 2B:
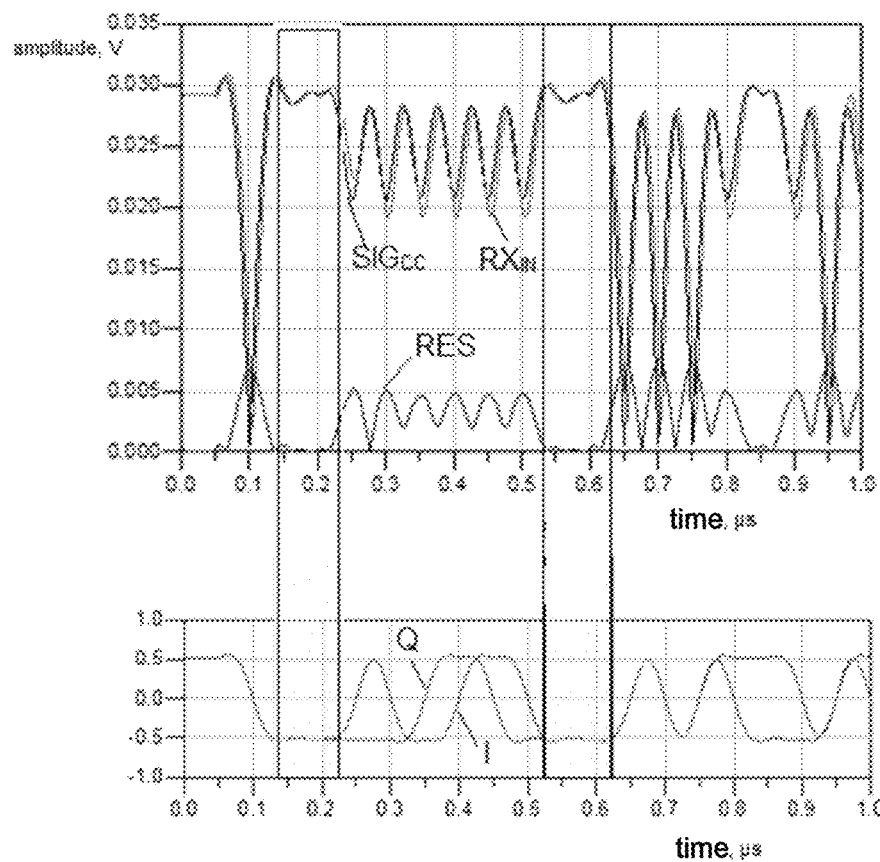
FIG. 2B: a simulation of the paths represented in FIG. 2A (already described)
Figure 3:
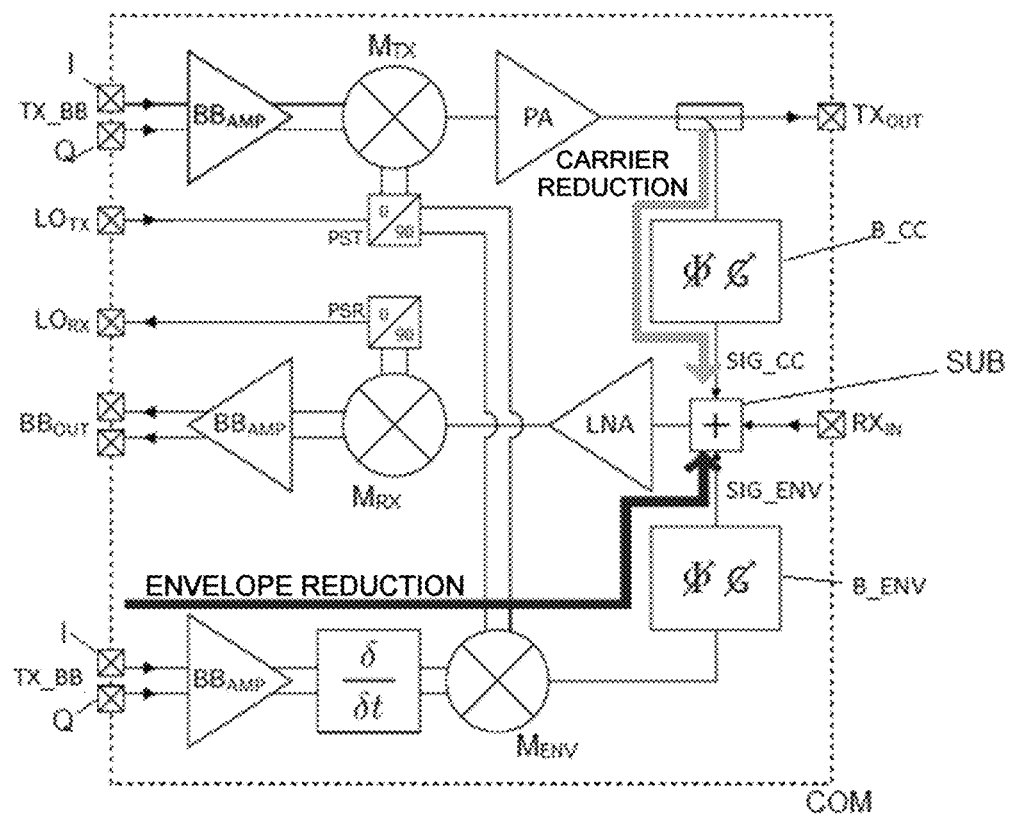
FIG. 3: an architecture of the reduction device according to the invention.

Consider FIG. 3, which schematically illustrates an architecture of the reduction device according to the invention, of a communication device COM. A baseband transmission signal $TX_{BB}$ comprises a component I (phase component) and a component Q (quadrature component), which can be amplified by a baseband amplifier $BB_{AMP}$. One example of signals of the components I and Q is shown at the bottom of FIG. 2B. In the case of a single-carrier modulation QPSK, each component I and Q can take two states. The component I is mixed by a mixer Mix with a transmission carrier signal $LO_{TX}$, and the component Q is mixed by the mixer Mix with the same transmission carrier signal $LO_{TX}$ (phase-shifted by 90° by the phase-shifting module PST. The sum of these two mixed signals is then amplified by an amplifier PA, and the amplified signal, designated $TX_{OUT}$, is sent to an antenna interface (not represented). The reception signal $RX_{IN}$ contains a self-interference contribution corresponding to the transmission signal $TX_{OUT}$, that the device according to the invention aims to erase. The reduction of the self-interference contribution aims to send to the low-noise amplifier LNA only the "useful" reception signal, that is to say without any self-interference contribution, to then be demodulated in a reception chain known to the person skilled in the art, notably comprising a mixer $M_{RX}$ and a phase-shifting module PSR, and finally have a baseband reception signal $BB_{OUT}$. It should be noted that the phase-shifting modules PST and PSR are not necessary for all the modulations, in particular for the non-complex modulations (for example the single-carrier modulation BPSK).

A replica of the transmission signal $TX_{OUT}$ is taken and is brought to a first reduction module $B_{CC}$. The first reduction module $B_{CC}$ applies a complex gain $G_{CC}^*$ to the transmission signal $TX_{OUT}$, in order to supply a first reduction signal $SIG_{CC}$. The complex gain $G_{CC}^*$ of the first reduction module $B_{CC}$ and applied to the transmission signal $TX_{OUT}$ can be determined periodically, and/or as a function of the change of environment, during a so-called calibration step, described later.

The subtractor SUB subtracts the first reduction signal $SIG_{CC}$ from the reception signal $RX_{IN}$. The subtraction of the two signals is, in reality, an addition of the signals by destructive interference, the complex gain $G_{CC}^*$ of the first reduction module Bcc being selected for the first reduction signal $SIG_{CC}$ to be in phase opposition relative to the reception signal $RX_{IN}$, with identical amplitude.

As mentioned previously, in case of variation of the envelope of the transmission signal $TX_{OUT}$, the reduction of the self-interference contribution is not perfect, allowing a residual signal RES to appear. The generation of a second reduction signal $SIG_{ENV}$, corresponding to the residual signal RES, would then make it possible, by subtracting the second reduction signal $SIG_{ENV}$ from the residual signal RES, to recover only the useful reception signal, stripped of any self-interference contribution.

Now consider that the transmission signal can be written in the form:

$$x(t)=A(t)\cdot e^{j\omega_c t}$$

in which A(t) denotes the envelope of the baseband signal $TX_{BB}$, and in which $\omega_c$ denotes the pulsing of the transmission carrier $LO_{TX}$.

Figure 1A:
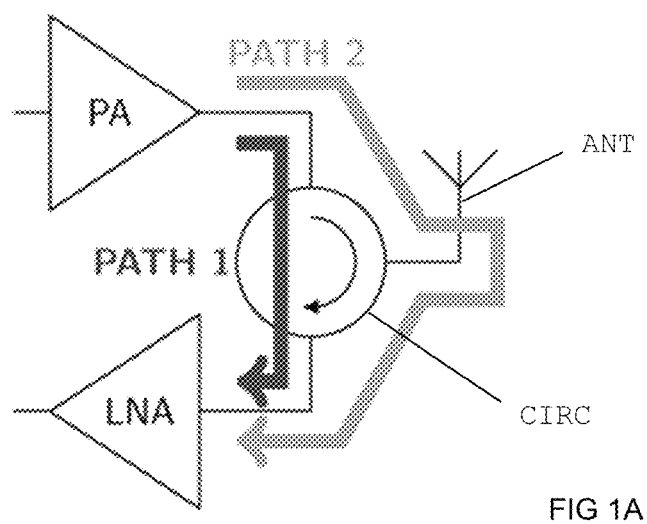
FIG. 1A: a full-duplex system with a single antenna of the prior art (already described)
Figure 1B:
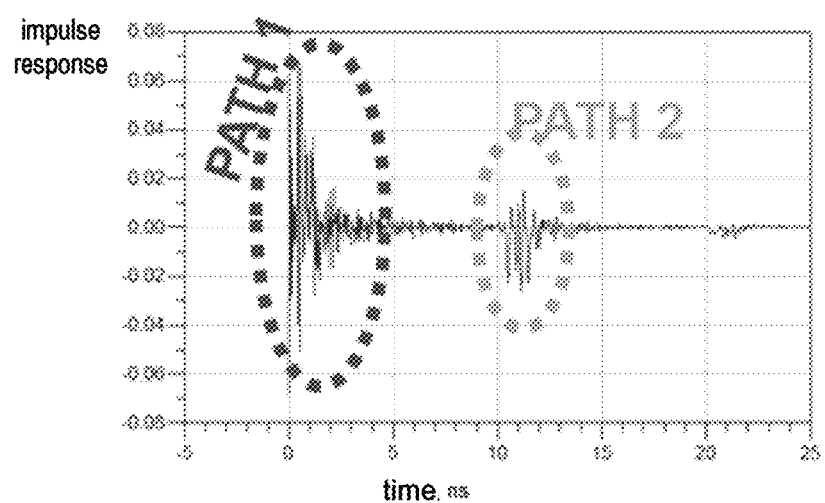
FIG. 1B: the impulse response illustrating the two self-interference paths of FIG. 1A (already described)

The reception signal $RX_{IN}$ comprising the self-interference contribution corresponds to the transmission signal $TX_{OUT}$, but with a real gain $G_{INT}$ representing the attenuation introduced by the passage through the antenna interface, and a delay $t_{INT}$ corresponding in particular to the paths in the antenna interface (see FIG. 1A).

The reception signal $RX_{IN}$ can therefore be written:

$$RX_{IN}(t)=G_{INT}\cdot A(t-t_{INT})\cdot e^{j\omega_c(t-t_{INT})}$$

The delay corresponding to the passage through the antenna interface can be broken down into a multiple of the period of the carrier plus a residual delay less than this period. The envelope varies slowly relative to the carrier, so it is therefore possible to approximate the total delay by the multiple of the period of the carrier, the residue being able to be seen as a phase term. The reception signal $RX_{IN}$ can therefore be written:

$$RX_{IN}(t)=G_{INT}\cdot A(t-t_{INT})\cdot e^{j\omega_c t+\varphi_{INT}}$$

Likewise, the first reduction signal $SIG_{CC}$ deriving from the first reduction module $B_{CC}$, can be written:

$$SIG_{CC}(t)=G_{CC}\cdot A(t-t_{CC})\cdot e^{j\omega_c(t-t_{CC})}$$

in which $G_{CC}$ designates the modulus of the complex gain applied to the replica of the transmission signal $TX_{OUT}$, and $t_{CC}$ designates the delay, corresponding to a phase-shift.

By considering the delay applied by the first reduction module $B_{CC}$ as being a phase-shift, the reception signal $SIG_{CC}$ can therefore be written:

$$SIG_{CC}(t)=G_{CC}\cdot A(t-t_{CC})\cdot e^{j\omega_c t+\varphi_{cc}}$$

The residual signal RES is the difference between the reception signal $RX_{IN}$ and the first reduction signal $SIG_{CC}$:

$$RES=RX_{IN}-SIG_{CC}$$

$$RES=G_{INT}\cdot A(t-t_{INT})\cdot e^{j\omega_c t+\delta_{INT}}-G_{CC}\cdot A(t-t_{CC})\cdot e^{j\omega_c t+\varphi_{cc}}$$

The phase $\varphi_{CC}$ and the gain $G_{CC}$ being aligned respectively on the phase $\varphi_{INT}$ and the gain $G_{INT}$ of the antenna interface, in a step of calibration of the phase and of the gain, the residue can be written as a function of an aligned phase φ and of an aligned gain G:

$$RES = G \cdot [A(t-t_{INT}) - A(t-t_{CC})] \cdot e^{j\omega_c t + \varphi}$$

The envelope signal A(t) can be likened, over short intervals, to a linear function, as the changes of envelope in FIG. 2B illustrate. Thus, A(t) can be written:

$$A(t) = \alpha \cdot t + \beta$$

in which α and β designate the parameters of a linear function.

Consequently, the residue can be written:

$$RES = G \cdot [(\alpha \cdot t - \alpha \cdot t_{INT}) - (\alpha \cdot t - \alpha \cdot t_{CC})] \cdot e^{j\omega_c t + \varphi}$$

$$RES = G \cdot \alpha \cdot (t_{CC} - t_{INT}) \cdot e^{j\omega_c t + \varphi}$$

$RES = G \cdot A'(t_{CC} - t_{INT}) \cdot e^{j\omega_c t + \varphi}$, in which A'(t) designates the temporal derivative of A(t).

In other words, the inventors have established that the residue can be seen as being the carrier signal modulated by the temporal derivative of the baseband input signal. Thus, by subtracting from the residue signal RES the baseband transmission signal, derived and delayed, and to which a complex gain $G_{ENV}^*$ is applied whose parameters are defined during a calibration step, it is possible to recover, in the reception chain, the useful reception signal, stripped of any self-interference contribution.

The delay to be applied to the derivative of the envelope signal corresponds to $t_{INT} - t_{CC}$. This delay can be applied to the already derived signal, but that would require applying a consequential analogue delay, with bulky delay lines. A preferred solution is to apply a digital delay to the envelope signal, the digital delay being able to be generated very simply, using, for example, a digital memory, then to derive this already delayed signal.

In order to derive the envelope signal, referring to FIG. 3, a temporal derivative (δ/δt), performed for example using a differentiator circuit, is applied to a replica of the components I and Q of the baseband transmission signal $TX_{BB}$, before these replicas are mixed, using a mixer $M_{ENV}$, with the same carrier as the transmission signal $TX_{OUT}$. The use of the same carrier allows the second reduction signal $SIG_{ENV}$ to be entirely synchronized on the transmission signal $TX_{OUT}$.

Figure 4:
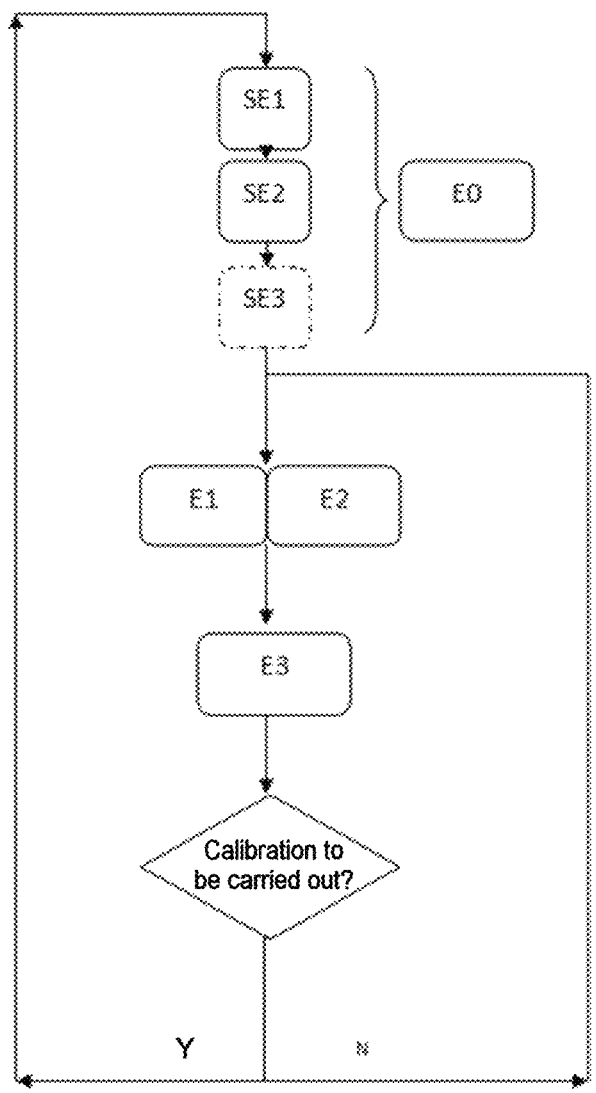
FIG. 4: a schematic illustration of the method according to the invention.
Figure 5:
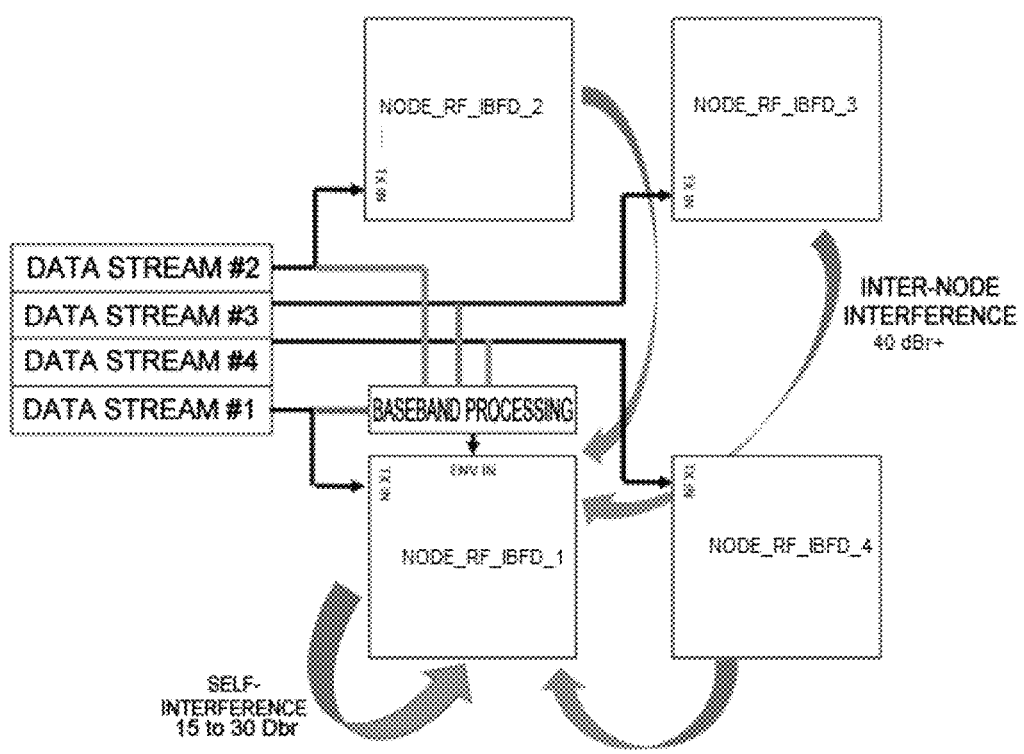
FIG. 5: an adaptation of the reduction device according to the invention to communications of MIMO type.

FIG. 4 illustrates a reduction method implemented by a circuit of the type of FIG. 3. It comprises a first reduction step E1, together with a second reduction step E2, then a step of subtraction E3 of the signals deriving from the first reduction step E1 and from the second reduction step E2. Periodically, or in case of a change of the environment of the full-duplex communication system, a calibration step E0 is performed, in order to correctly parameterize the first reduction module $B_{CC}$ and the second reduction module $B_{ENV}$.

The calibration allows the reduction device to take account of its environment, and to follow the modifications of the environment, for example, the reflection sources, likely to generate several self-interference contributions. The calibration consists in selecting a complex gain, namely a gain in amplitude and a phase-shift, that the first reduction module $B_{CC}$ and the second reduction module $B_{ENV}$ will apply with constant parameters between two calibration procedures.

The calibration step E0 is done in at least two distinct substeps. The first substep SE1 consists, initially, in determining the gain and phase parameters of the first reduction module $B_{CC}$, by transmitting a given transmission signal $TX_{OUT}$. The determination of the gain and phase parameters can be performed for example by varying each of the two parameters in steps and by selecting the pair of parameters which minimizes a power of a difference signal between the reception signal $RX_{IN}$ and the first reduction signal $SIG_{CC}$, said power being able to be measured using a power detector arranged in the reception chain.

Once these parameters of the first reduction module $B_{CC}$ are identified, the second substep SE2 consists in determining the complex gain parameters $G_{ENV}^*$ of the second reduction module $B_{ENV}$, as well as the digital delay to be applied to the replica of the baseband transmission signal $TX_{BB}$ before deriving it. Like the determination of the parameters of the complex gain $G_{CC}^*$, the determination of the parameters of the complex gain $G_{ENV}^*$ can be performed for example by varying each of the two gain and phase parameters in steps and by selecting the pair of parameters which minimizes a power at the output of the subtractor. During this second substep SE2, an optimal digital delay is determined, in order to minimize, as in the substeps SE1 and SE2, the output power of the subtractor SUB. As an alternative, the optimal digital delay can be determined during a substep SE3, distinct from the substep SE2, which notably has the advantage of being able to separate, in the simulation of the method according to the invention, the observation of the optimization of the parameters of the complex gain $G_{ENV}^*$ and of the digital delay.

The present invention has been presented in the case of a system with a single antenna interface INT. It could be applied also to multiple-antenna systems of "MIMO" (Multiple Input Multiple Output) type. FIG. 6 illustrates an adaptation to MIMO communications of the reduction device according to the invention. In the context of full-duplex MIMO communications, each antenna would then have two levels of interferences to be distinguished, namely its own self-interference contribution, and the interferences from the other antennas of the MIMO system, whose level is lower. These two types of interferences could be processed by the reduction method according to the invention.

The description refers only to a single self-interference contribution to be erased. However, as the processing is linear, it can be generalized to the reduction of several self-interference contributions.

The invention claimed is:

1. A method for reducing at least one self-interference contribution in a full-duplex wireless communication system, configured to transmit a transmission signal with a transmission carrier and modulated by a baseband signal, and configured to receive a reception signal containing at least one self-interference contribution corresponding to the transmission signal, said reduction method comprising:

at least one first reduction step, in which a first reduction module takes a replica of the transmission signal and generates a first reduction signal, a second reduction step, in which a second reduction module generates a second reduction signal that is a function of the temporal derivative of the replica of the baseband signal, a subtraction step in which the first reduction signal and the second reduction signal are subtracted from the reception signal, and a calibration step prior to said first and second reduction steps and prior to said subtraction step, said calibration step comprising the following substeps:

a first substep of determination of a first complex gain of the first reduction module, which minimizes a residue signal corresponding to the difference between the self-interference contribution included in the reception signal and corresponding to the transmission signal, and the first reduction signal; then a second substep of determination of a second complex gain of the second reduction module which minimizes the difference between the residue signal and the second reduction signal, wherein the calibration step further comprises a substep of determination of a digital delay minimizing the difference between the residue signal and the second reduction signal, said substep of determination of a digital delay being performed after the first substep of determination of a first complex gain and after the second substep of determination of a second complex gain.

2. The method according to claim 1, a temporal derivative of said replica of the baseband signal mixed with the transmission carrier being supplied to the second reduction module.

3. The method according to claim 2, said second reduction module applying a second complex gain to the temporal derivative of the replica of the baseband signal mixed with the transmission carrier, the second complex gain being determined so as to generate a destructive interference between, on the one hand, a residue of the destructive interference between the at least one self-interference contribution included in the reception signal and the first reduction signal, and, on the other hand, the second reduction signal.

4. The method according to claim 1, a digital delay being applied to said replica of the baseband signal before said replica is supplied to the second reduction module.

5. The method according to claim 1, said first reduction module applying a first complex gain to a replica of the transmission signal in order to supply the first reduction signal, the first complex gain being determined so as to generate a destructive interference between the self-interference contribution included in the reception signal and the first reduction signal.

6. The method according to claim 1, said substep of determination of the second complex gain further comprising the determination of a digital delay minimizing the difference between the residue signal and the second reduction signal.

7. The method according to claim 1, said calibration step being performed periodically or in case of a change of the environment of the full-duplex wireless communication system.

\* \* \* \* \*